Oct. 16, 1962     T. P. SPALDING     3,058,561
CENTRIFUGAL CLUTCH
Filed Dec. 2, 1959
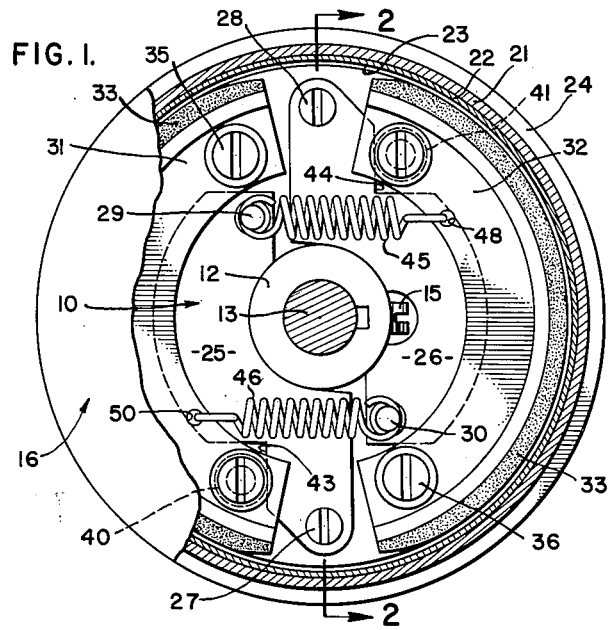
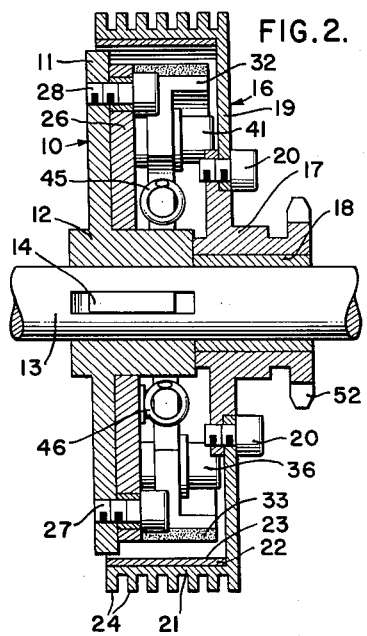
INVENTOR.
THOMAS P. SPALDING
BY
*Lyon & Lyon*
ATTORNEYS.

3,058,561
CENTRIFUGAL CLUTCH
Thomas P. Spalding, 454 E. Duarte Road,
Monrovia, Calif.
Filed Dec. 2, 1959, Ser. No. 856,795
7 Claims. (Cl. 192—105)

This invention relates to centrifugal clutches and is particularly directed to an improved form of centrifugally operated friction clutch having novel means for centrifugally actuating friction shoes into driving engagement.

It is an important object of the present invention to provide a centrifugal clutch particularly adapted for connecting a prime mover to a load. In a typical installation, the centrifugal clutch may be employed to establish a driving connection between a small internal combustion engine and a lawn mower, power edger, small automobile, or the like.

In the drawings:

FIGURE 1 is side elevation partly broken away showing a preferred embodiment of this invention.

FIGURE 2 is a sectional elevation taken substantially on the lines 2—2 as shown in FIGURE 1.

FIGURE 3 is a view of certain of the parts shown in FIGURE 1, other parts being omitted for clarity of illustration.

FIGURE 4 is a perspective view in idealized form showing the mounting of one of the centrifugally operated weight elements on the driving member.

FIGURE 5 is a sectional detail taken substantially on the lines 5—5 as shown in FIGURE 3.

FIGURE 6 is a sectional detail taken substantially on the lines 6—6 as shown in FIGURE 3.

Referring to the drawings, the driving member generally designated 10 may comprise a flange 11 having a hub 12. The hub is fixed on a driving shaft 13 by an axially extending key 14 held in place by a set screw 15.

A driven member 16 includes a hub 17 provided with a bushing 18 mounted to turn on a shaft 13. The flange 19 may be formed integrally with the hub 17, or, as shown in the drawings, may be separately formed and connected thereto by means of fastenings 20. A cylindrical shell 21 is fixed to the outer portion of the flange 19 and may be provided with a cylindrical liner 22 having an internal drum surface 23. Fins 24 may be provided on the outer surface of the shell 21 for dissipation of heat. Weight elements 25 and 26 are provided and these are substantial duplicates. The weight element 25 is pivotally connected to the flange 11 of the driving member 10 by means of the pivot pin 27. Similarly, the weight element 26 is pivotally connected to the flange 11 of the driving member 10 by means of the pivot pin 28. A lug 29 is provided on the swinging end of the weight member 25. Similarly, a lug 30 is provided on the swinging end of the weight element 26.

Arcuate shoes 31 and 32 are provided and these are substantially duplicates. Each is provided with a friction lining 33 on its outer surface. The lining 33 may be bonded to the shoes 31 and 32 or may be attached by conventional rivets 34 as shown on the drawings. A pivotal support element 35 connects the shoe 31 on the flange 11 of the driving member 10, and similarly, the pivotal support 36 connects the shoe 32 to the flange 11 of the driving member 10. It will be noted that the pivotal supports 35 and 36 are diametrically positioned on opposite sides of the axis of the rotary member, and that the same is true with regard to the pivot pins 27 and 28.

The shoe 31 is provided with a contact roller 40 at a location remote from the pivotal support 35. Similarly, the shoe 32 is provided with a contact roller 41 at a location remote from its pivotal support 36. A shoulder 43 on the weight member 25 near its pivot pin 27 contacts the roller 40 on the shoe 31, and a shoulder 44 on the weight member 26 contacts the roller 41 on the shoe 32.

Tension coil springs 45 and 46 are provided to resist swinging movement of the weight members 25, 26 and shoes 31 and 32 in a direction away from the rotary axis. One end of the spring 45 is connected to the lug 29 on the swinging end of the weight member 25. The other end is connected at 48 to the shoe 32 at a location remote from the pivotal support 36. Similarly, one end of the spring 46 is connected to the lug 30 provided on the swinging end of the weight member 26 and the other end of the spring is connected at 50 to the friction shoe 31 at a location remote from the pivotal support 35. It will be observed that each of the weight members engages one of the friction shoes and is connected by a spring to the other of the friction shoes. The springs act to hold the shoulders 43 and 44 in engagement with the rollers 40 and 41, respectively.

In operation, the shaft 13 is rotated under power, thereby rotating the driving member 10, together with the weight members 25 and 26 and the friction shoes 31 and 32. The springs 45 and 46 prevent the shoes from moving radially outward into contact with the internal drum surface 23 on the driving member 16. When the rotary speed of the shaft 13 is increased, each friction shoe 31, 32 moves outward under centrifugal force to bring the lining 33 into engagement with the internal drum surface 33. However, this action of each friction shoe is resisted by the tension of the springs with the result that the rollers 40 and 41 remain in contact with the shoulders 43 and 44, respectively, so that drum-engaging movement of the friction shoes occurs only when sufficient rotary speed is present to cause the weight members 25 and 26 to swing outward against the action of the springs 45 and 46. The weight members 25 and 26 are preferably formed of ferrous material, and hence are relatively heavy, whereas the friction shoes 31 and 32 are preferably formed of aluminum alloy and hence are relatively light in weight.

When the rotary speed is sufficiently great to cause the shoes 31 and 32 to engage in driving relationship within the cylindrical drum 23, the driven member 16 turns with the shaft 13 and drives the power take-off sprocket 52.

Having fully described my invention it is to be understood that I do not wish to be limited to the details set forth above, but my invention is of the full scope of the appended claims.

I claim:

1. In a centrifugal clutch, the combination of: a driving member, a coaxial rotary driven member having an internal drum surface, a pair of weight elements, pivot means at diametrically spaced locations mounting said weight elements on the driving member, each weight element having a shoulder located near its respective pivot means and a swinging end located remote therefrom, a pair of friction shoes, pivotal support means mounting said friction shoes on the driving member for swinging movement into friction drive relation with said internal drum surface, each friction shoe having a part remote from its respective pivotal support means engaged by one of said shoulders, respectively, and a pair of springs, each spring engaging one of the friction shoes and engaging the swinging end of one of the weight elements, respectively, whereby each of the weight members engages one of the friction shoes and is connected by a spring to the other of the friction shoes.

2. In a centrifugal clutch, the combination of: a driving member, a coaxial rotary driven member having an internal drum surface, a pair of weight elements, pivot means at diametrically spaced locations mounting said weight elements on the driving member, each weight element having a shoulder located near its respective pivot means and a swinging end located remote therefrom, a pair of friction shoes, pivotal support means mounting said pivot shoes on the driving member for swinging movement into friction drive relation with said internal drum surface, each friction shoe having a roller remote from its respective pivotal support means engaged by one of said shoulders, respectively, and a pair of springs, each spring engaging one of the friction shoes remote from its pivotal support and engaging the swinging end of one of the weight elements, respectively, whereby each of the weight members engages one of the friction shoes and is connected by a spring to the other of the friction shoes.

3. In a centrifugal clutch, the combination of: a driving member, having a rotary axis, a coaxial rotary driven member having a cylindrical internal drum surface, a pair of weight elements, pivot means mounting said weight elements on the driving member, said pivot means including a pair of pivot pins mounted on the driving member at diametrically opposed locations with respect to the rotary axis of the driving member, each weight element having a shoulder located near its respective pivot means and a swinging end located remote therefrom, a pair of friction shoes, pivotal support means mounting said pivot shoes on the driving member for swinging movement into friction drive relation with said internal drum surface, each friction shoe having a part remote from its respective pivotal support means engaged by one of said shoulders, respectively, and a pair of springs, each spring engaging one of the friction shoes and engaging the swinging end of one of the weight elements, respectively, whereby the springs oppose pivotal movement of the weight elements and friction shoes away from said rotary axis.

4. In a centrifugal clutch, the combination of: a driving member, having a rotary axis, a coaxial rotary driven member having a cylindrical internal drum surface, a pair of weight elements, pivot means mounting said weight elements on the driving member, said pivot means including a pair of pivot pins mounted on the driving member at diametrically opposed locations with respect to the rotary axis of the driving member, each weight element having a shoulder located near its respective pivot means and a swinging end located remote therefrom, a pair of friction shoes, pivotal support means mounting said pivot shoes on the driving member for swinging movement into friction drive relation with said internal drum surface, each friction shoe having a roller thereon remote from its respective pivotal support means engaged by one of said shoulders, respectively, and a pair of tension coil springs, each spring engaging one of the friction shoes remote from its pivotal support and engaging the swinging end of one of the weight elements, respectively, whereby the springs oppose pivotal movement of the weight elements and friction shoes away from said rotary axis.

5. In a centrifugal clutch the combination of: a driven member having an internal drum surface, a flange shaped driving member being coaxially and rotatably mounted relative to said driven member, a pair of diametrically spaced pivot means mounted on said driving member, a pair of arcuate frictional shoes each having a pivotal end and a swinging end, the pivotal end of each shoe being mounted on said pivot means, a second pair of diametrically spaced pivot means mounted on the driving member, a pair of weight elements each having a pivotal end and a swinging end, the pivotal end of each weight being mounted on said second pivot means, a shoulder on each weight element adjacent the pivotal end thereof, a roller mounted on the swinging end of each shoe, each said roller slidably engaging a shoulder on the said weight elements, a pair of springs, each spring extending between and engaging the swinging end of one shoe and the swinging end of one weight element, each shoe being connected to one weight by the spring element and engaging the shoulder of the other weight element through the said roller mounted on that shoe.

6. In a centrifugal clutch the combination of: a driven member having an internal drum surface, a flange shaped driving member being coaxially and rotatably mounted relative to said driven member, a pair of diametrically spaced pivot means mounted on said driving member, a pair of arcuate frictional shoes each having a pivotal end and a swinging end, the pivotal end of each shoe being mounted on said pivot means, a second pair of diametrically spaced pivot means mounted on the driving member, a pair of weight elements each having a pivotal end and a swinging end, the pivotal end of each weight being mounted on said second pivot means, a shoulder on each weight element adjacent the pivotal end thereof, a roller mounted on the swinging end of each shoe, each said roller slidably engaging a said shoulder on the said weight elements, whereby outward movement of the weight element urges the swinging end of the shoe outwardly into frictional engagement with the drum surface, a pair of springs, each spring extending between and engaging the swinging end of one shoe and the swinging end of one weight element, each shoe being connected to one weight by the spring element and engaging the shoulder of the other weight through the said roller mounted on that shoe.

7. In a centrifugal clutch the combination of: a driven member having an internal drum surface, a flange shaped driving member being coaxially and rotatably mounted relative to said driven member, right and left arcuate shoes having outer frictional surfaces for engaging the said drum surface, each shoe having an upper end and a lower end, first pivot means on the lower end of the right shoe pivotally mounting that shoe to the said driving member, a second pivot means on the upper end of the left shoe pivotally mounting that shoe to the said driving member at a location diametrically opposite the first pivot means, right and left weight elements each having an upper end and a lower end, a pivot means on the upper end of the right weight element pivotally mounting that element to the said driving member at a location immediately to the right of the second pivot means, a pivot means on the lower end of the left weight element pivotally mounting that element to the said driving member at a location immediately to the left of the first pivot means and also diametrically opposite the right weight element pivot means, each weight element having a shoulder near the pivot means thereon, each shoe having a roller mounted on the end remote from the pivot means of that shoe, the roller on the right shoe engaging the shoulder on the right weight element, the roller on the left shoe engaging the shoulder on the left weight element, a tensioning spring connecting the upper end of the left weight element and the upper end of the right shoe, a second tensioning spring connecting the lower end of the right weight element to the lower end of the left shoe, whereby outward movement of the either weight element urges the shoe on that side outwardly and outward movement of either weight element is restrained by spring connection to the shoe on the opposite side.

References Cited in the file of this patent

UNITED STATES PATENTS

| 2,048,435 | Dodge | July 21, 1936 |
| 2,151,950 | Tyler | Mar. 28, 1939 |
| 2,392,950 | Russell | Jan. 15, 1946 |
| 2,696,282 | Van Ausdall | Dec. 7, 1954 |

FOREIGN PATENTS

| 755,898 | France | Sept. 11, 1933 |